Patented Jan. 1, 1924.

1,479,327

UNITED STATES PATENT OFFICE.

HUGH C. SICARD, OF NIAGARA FALLS, NEW YORK, ASSIGNOR TO UNITED STATES FERRO ALLOYS CORPORATION, OF NEW YORK, N. Y., A CORPORATION OF NEW YORK.

METHOD OF TREATING STEEL.

No Drawing.  Application filed November 8, 1921. Serial No. 513,768.

*To all whom it may concern:*

Be it known that I, HUGH C. SICARD, a citizen of the United States of America, and a resident of the city of Niagara Falls, county of Niagara, State of New York, have invented a new and useful Method of Treating Steel, of which the following is a full, clear, and exact description.

This invention relates generally to the treatment of steel and more particularly to the purifying of steel.

It is well known that steel during its manufacture is best purified by means of some suitable deoxidizer and further, that aluminum is the best and most powerful deoxidizer to use for this purpose.

There is but little steel made in which aluminum is not used as a deoxidizer and frequently it is so used as a final addition at the time of pouring the steel melt. Other deoxidizers such as manganese, silicon and the like are used, but for the final deoxidation and for the purpose of making sure that deoxidation is complete, an addition of aluminum is usually made. Unfortunately, the use of aluminum has one material difficulty for the reason that, when it combines with the oxygen in the steel, it forms the oxide of aluminum, alumina, which has an extremely high melting point. At the moment of the formation of the alumina, the extremely high temperature produced by the exothermic reaction, no doubt, forms alumina in a molten condition, but this is instantly solidified by the surrounding mass of relatively cold steel and thus the steel is filled with minute globules of alumina which are entrapped in it. When an ingot of steel containing these globules of alumina is subsequently rolled, they produce defects in the finished steel and generally give it inferior physical properties. The detrimental effect of these alumina inclusions in steel is well known to those skilled in the art of steel manufacture.

Alumina has a fusing temperature of 2100° C. and it will be readily seen that even when the high temperature of reaction, produced by its formation, fuses the alumina, the surrounding mass of steel, which is far below the fusing point of the alumina, will instantly cause it to solidify.

The chief object of my invention is to make an addition to the steel, which has been treated with aluminum, such that it will lower the melting point of the alumina and for this purpose I have found that titanic oxide is suitable.

As above stated, the alumina has a fusing or melting point at 2100° C. Titanic oxide has a melting point at 1800° C. If these two oxides are mixed, the combined oxides have a much lower melting point. For example:

If 10% of titanic oxide is added to alumina, a melting point of 1500° C. is obtained for the combination;

If 20% of titanic oxide is added to the alumina, a melting point of 1400° C. is obtained;

If 30% of titanic oxide is added to the alumina, a melting point of 1300° C. is obtained.

I will now describe a preferable way of carrying out my invention when applied in open hearth practice for making soft steel without silicon; for example, when used for soft wire, sheets, tin plate and the like. When the heat is tapped, aluminum is added in the ladle, in a quantity equal to a few ounces per ton of steel treated. Following this, titanic oxide is thrown into the spout of the furnace as the stream of molten metal flows out into the ladle. The titanic oxide is thus thoroughly incorporated with the metal and will combine with the alumina as hereinbefore stated. In treating relatively small amounts of steel, I have found it better and safer to add the titanic oxide before the aluminum addition is made, but when greater amounts of steel are being treated, the aluminum may be added before the titanic oxide.

Titanic oxide may be used in various forms; either as the artificially prepared compound or as the ore rutile which is a naturally occurring form of titanic oxide, or even as ilmenite, a natural oxide of titanium and iron; or it may be added in any other suitable form contained in paper bags as it is thrown into the spout of the furnace.

It is well known that if ferro-silicon is added to steel when tapping, a part of the silicon does not appear in the finished product. This is undoubtedly due to the fact that some of the silicon has been oxidized to silica, the silicon thus playing the role of a deoxidizer. The silica thus produced may or may not escape out of the metal with the slag flowing to the surface of the metal in the ladle. If it remains in the metal, it will produce defects like those already referred to which are produced by the alumina. But, if aluminum and titanic oxide are used so that alumina and titanic oxide are present in the steel, these, combined with the silica will produce a much more fusible combination which will thus readily escape with the slag to the surface of the metal, leaving a better product than would otherwise be obtained. Thus the use of titanic oxide in my invention makes such oxide a more or less general scavenger in the manufacture of steel.

Titanium may be used as a deoxidizer in the manufacture of steel in which case it is oxidized to titanic oxide and posssibly to titanium nitride. When the titanic oxide is formed, it will play the same role as a flux in my process; but, in my process, titanium, as such, is not used, but rather and preferably titanic oxide.

I usually try to add a quantity of titanic oxide equal in amount to the aluminum used, but, even an excess is not objectionable since this will combine with other oxides, such as silica, lime and the like, thereby reducing their melting points.

Aluminum is a cheaper deoxidizer than titanium. This will be seen from the equations representing the reactions of aluminum and titanium as deoxidizers, which are, respectively, as follows:

$$(1) \quad 2Al + 3O = Al_2O_3$$
$$(2) \quad Ti + 2O = TiO_2$$

In considering the atomic weights of the elements of these two equations, it will be seen from equation (1) that one pound of aluminum will combine with 0.89 pounds of oxygen; while from equation (2), it will be seen that one pound of titanium will combine with only 0.66 pounds of oxygen. Therefore, it is clear that it is cheaper and better to deoxidize with aluminum than with titanium, using, with the aluminum, titanic oxide to remove the alumina.

Having thus described my invention, what I claim is:

1. A process of treating steel comprising the addition to the molten metal of aluminum and the addition of a metallic oxide which will combine with the alumina, formed by the reaction of the steel and aluminum, and lower the melting point of the alumina, whereby the impurities contained in the steel will escape with the slag and flow to the surface of the molten metal.

2. A process of treating steel comprising the addition to the molten metal of aluminum and the addition of titanic oxide which will combine with the alumina, formed by the reaction of the steel and aluminum, and lower the melting point of the alumina, thereby purifying the product.

3. A process of treating steel comprising the addition to the molten metal of aluminum and the addition also at least of an equal amount of titanic oxide which will combine with the alumina, formed by the reaction of the steel and aluminum, and lower the melting point of the alumina, thereby purifying the product.

4. A process of treating steel comprising the addition to the molten metal of aluminum and a minimum of one ounce of titanic oxide to each ton of steel treated, which oxide will combine with the alumina, and thereby purify the product.

5. A process of treating steel comprising the addition to the molten metal of aluminum and simultaneously adding titanic oxide, which will combine with the alumina and thereby purify the product.

6. A process of treating steel comprising the addition to the molten metal of aluminum and the addition of rutile which will combine with the alumina and thereby purify the product.

7. A process of treating steel comprising the addition to the molten metal of aluminum and the addition of a titaniferous oxide which will combine with the alumina, formed by the reaction of the steel and aluminum, and lower the melting point of the alumina, thereby purifying the product.

8. A process of treating steel comprising the addition to the molten metal of aluminum and the addition of artificially prepared titanic oxide which will combine with the alumina and thereby purify the product.

9. A process of treating steel comprising the addition to the molten metal of a minimum of at least two ounces of aluminum to each ton of steel treated and the addition at least of an equal amount of titanic oxide which will combine with the alumina and thereby purify the product.

In testimony whereof, I have hereunto signed my name.

HUGH C. SICARD.